April 28, 1953    B. H. CANADY ET AL    2,636,782
DUAL WHEEL MOUNTING
Filed July 27, 1950

INVENTORS
Buel H. Canady
Clifford J. Wiley
BY

ATTORNEY

Patented Apr. 28, 1953

2,636,782

UNITED STATES PATENT OFFICE 2,636,782

DUAL WHEEL MOUNTING

Buel H. Canady, Huntington Park, Calif., and Clifford J. Wiley, Winslow, Ariz.

Application July 27, 1950, Serial No. 176,178

2 Claims. (Cl. 301—6)

Our invention relates to a dual wheel mounting.

A primary object of the invention is to provide a dual wheel assembly which is less expensive to build, and easier to assemble, disassemble and inspect than other conventional dual wheel assemblies.

A further object of the invention is to provide a dual wheel mounting which is extremely strong and durable, and constructed so that the disc wheels cannot freeze or bind upon the hub or wheel studs.

A further object is to provide a dual wheel assembly for heavy trucks, busses, and the like, wherein a novel wheel attaching bolt or stud is provided for securing both disc wheels and the brake drum to the wheel hub, the studs carrying the full load of the vehicle and coacting with the disc wheels in a novel manner to maintain the assembly tight during use.

A still further object of the invention is to provide a dual wheel assembly which may be mounted, dismounted and inspected from the outer side of the wheel, without the necessity of working from the inner or brake drum side.

Other objects and advantages of the invention will be apparent during the course of the following description.

The instant application S. N. 176, 178 shows subject matter in common with our co-pending application for Dual Wheel Mounting, S. N. 179,624, filed August 15, 1950, and also subject matter which is specifically different, and since the instant application S. N. 176,178 was filed July 27, 1950, prior to the filing date of August 15, 1950, of application 179,624, the claim which is generic to the constructions shown in the two applications is placed in the earlier filed application 176,178.

Figure 1:
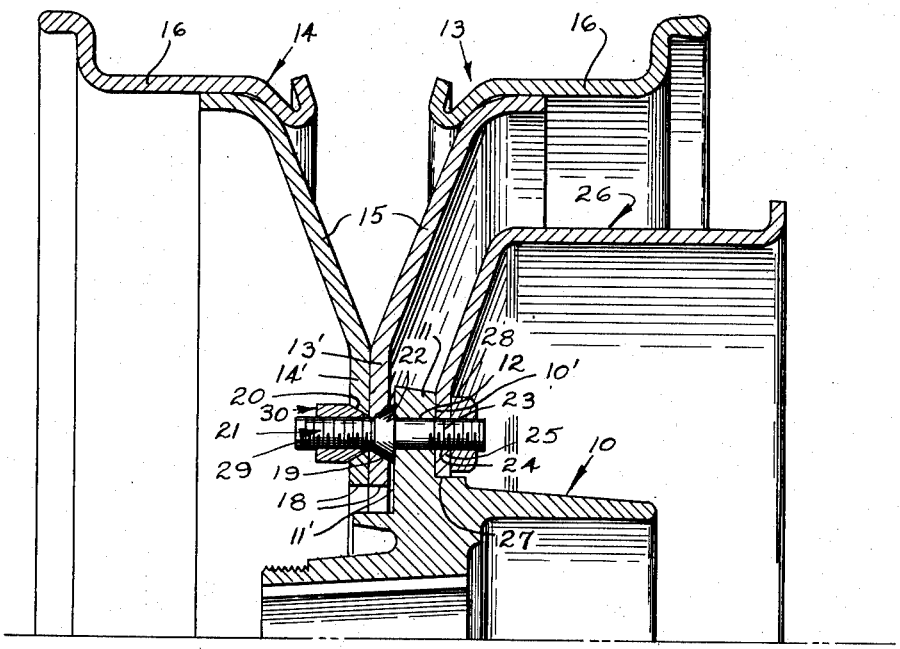
Figure 2:
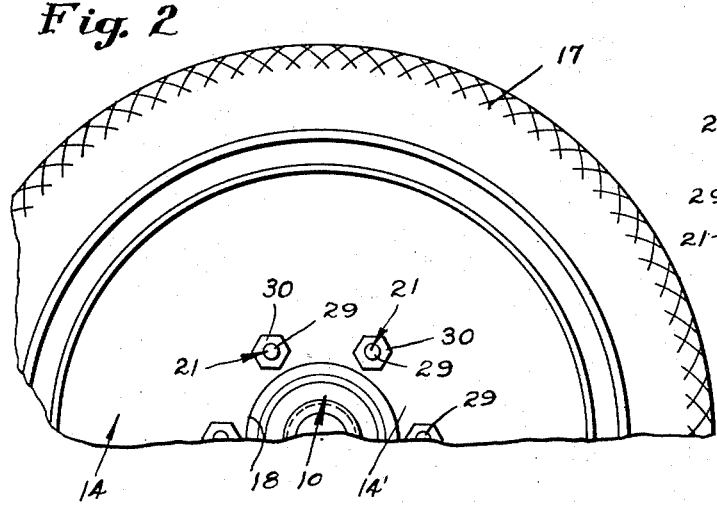
Figure 3:
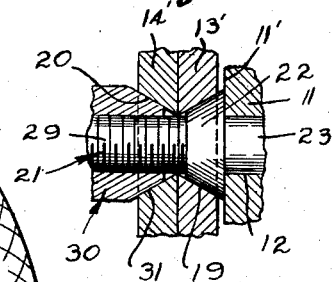

In the accompanying drawings, forming a part of this application, and in which like numerals are employed to designate like parts throughout same, Figure 1 is a radial cross-section through a dual wheel mounting embodying our invention, Figure 2 is a fragmentary side elevation of the wheel mounting drawn on a reduced scale, and, Figure 3 is an enlarged detail section through one wheel attaching stud and associated elements.

In the drawings, where for the purpose of illustration is shown a preferred embodiment of our invention, the numeral 10 designates a wheel hub which is mounted upon the vehicle axle, not shown, in a conventional manner. The hub 10 includes an annular radial spoke flange or plate 11, integral therewith, and having inner and outer flat faces or ends 10' and 11'. The spoke flange 11 is provided near and inwardly of its periphery with a plurality of circumferentially equidistantly spaced axial cylindrical openings 12, arranged radially outwardly of the body portion of the hub, as shown.

The numerals 13 and 14 designate inner and outer disc wheels comprising annular flat inner disc portions 13' and 14', which extend radially, and outer generally radial diverging portions 15, upon the circumferences of which are mounted rims 16, rigidly secured thereto by any conventional means, such as by welding. The rims 16 are of conventional construction, and adapted to carry pneumatic tires 17, as shown in Figure 2. The flat disc portions 13' and 14' have large central axial openings 18 which register, and permit the disc wheels to pass over the outer end of the hub 10. The disc portions 13' and 14' are further provided radially outwardly of the openings 18 with inner and outer conical openings 19 and 20. The inner and outer conical openings 19 and 20 are arranged in circumferentially equidistantly spaced groups which are adapted to register with each other and with the group of openings 12 in the hub flange 11. The inner conical openings 19 taper axially outwardly, and the outer conical openings 20 taper axially inwardly. The openings 19 and 20 extend entirely through the respective discs 13' and 14'. The inner and outer conical openings 19 and 20 preferably have the same degree of taper, and also preferably have equal diameters, so that the small ends of the conical openings, at the meeting faces of the discs 13' and 14' register. We prefer that the conical openings 19 and 20 have included angles of approximately 60 degrees, but we do not wish to restrict the invention to any particular degree of taper, and the degree of taper of the conical openings may be varied. It is also preferred that the diameters of the conical openings 19 and 20 at their opposed small ends be substantially equal to the diameters of the openings 12.

Axial bolts or studs 21 are provided, and these bolts have enlarged conical lugs or shoulders 22, integral therewith, and arranged near the longitudinal centers of the studs. The lugs 22 taper axially outwardly, and have the same degree of taper as the openings 19 in which they engage. The inner ends of the conical lugs 22 engage the outer face 11', and inner screw-threaded extensions 23 of the studs 21 extend through the openings 12, and through registering openings 24 in the outer flat radial web or disc 25 of a wheel brake drum 26. The radial web 24 engages the inner face of the spoke flange 11, and is provided with a central axial opening 27, receiving the inner end of the hub 10. The stud extensions 23 project axially inwardly of the web 25 and are provided at their inner ends with nuts 28 which are tightened against the inner face of the brake drum web 25, for drawing the conical lugs 22 tightly against the spoke flange 11.

As shown clearly in Figure 3, the inner or larger flat ends of the conical lugs 22 extend axially inwardly beyond the inner face of the disc 13', and the outer or smaller ends of the lugs 22 terminate axially inwardly of the meeting faces of the discs 13' and 14'. With this arrangement, the inner disc is maintained spaced axially outwardly slightly from the outer face 11'. This prevents any possible freezing or binding between the inner disc wheel 13 and the spoke flange 11. Outer screw-threaded extensions 29 of the studs 21 extend through the conical openings 20 and axially outwardly of the web 14', for the reception of wedge nuts 30, having inner conically tapered portions or ends 31, engaging axially within the conical openings 20. The inner ends of the nuts 30 terminate axially outwardly of the meeting faces of the discs 13' and 14', so that the inner ends of the nuts 30 are spaced from the outer opposed ends of the lugs 22, Figure 3, even when the wedge nuts 30 are tightened to the fullest possible extent. When the wedge nuts 30 are drawn up tightly, the flat discs 13' and 14' are drawn into tight contact, and are in engagement throughout their entire areas. Since the discs are flat, and since there is always space between the opposed ends of the lugs 22 and nuts 30, there is no liability of the disc wheels 13 and 14 freezing or binding together in assembly. There is likewise no liability of either of the disc wheels binding or freezing upon the attaching studs 21. When the wedge nuts 30 are tightened, they wedge tightly into the conical openings 20 and cause the lugs 22 to likewise wedge tightly into the openings 19, so that there is no liability of the dual wheel assembly loosening during use.

With our arrangement described above, and with the studs 21 first applied to the spoke flange 11 for securing the brake drum 26 in place, the disc wheels 13 and 14 may be applied and removed from the outer side of the wheel, it being unnecessary to work from the inner side of the brake drum 26. Since the openings 19 and 20 taper in opposite directions, when the wedge nuts 30 have been removed, both disc wheels are removable from the outer side of the wheel. Also, the dual wheel assembly may be readily inspected and tightened from the outer side of the wheel. The entire load of the vehicle is transmitted through the hub 10 to the studs 21, and the brake drum 26 is thus required to carry no part of the load. The conical openings 19 and 20 afford maximum bearing areas to absorb the load transmitted through the studs 21 to the wheel discs 13' and 14'. The entire construction is extremely sturdy and durable, and all parts are easy to machine, so that the wheel assembly is relatively inexpensive to fabricate.

It is to be understood that the form of our invention herewith shown and described is to be taken as a preferred example of the same, and that various changes in the shape, size and arrangement of parts may be resorted to without departing from the spirit of our invention or the scope of the subjoined claims.

Having thus described our invention, we claim:

1. A dual wheel assembly comprising a hub having a spoke flange provided with a radially flat outer face and having circumferentially spaced cylindrical openings extending axially of the flange, a wheel brake drum having a web arranged upon the inner side of the flange and provided with circumferentially spaced openings extending axially of the hub, bolts extending through the openings in the flange and web and corresponding in number to the openings for securing the web to the flange, said bolts extending outwardly beyond the flange, inner and outer disc wheels to be secured to the hub and including parallel radial disc portions having main openings for receiving a portion of the hub and larger than such hub portion so that the disc portions are free from thermal contact with the hub at the main openings; the disc portions having their adjacent faces contacting, the disc portion of the inner wheel having circumferentially spaced openings extending through the opposite faces of such disc portion and tapered outwardly throughout their entire lengths, and the disc portion of the outer wheel having circumferentially spaced openings extending through the opposite faces of such disc portion and tapered inwardly throughout their entire lengths, the tapered openings extending axially of the hub and being in alignment with each other and the openings in the flange and corresponding in number to the flange openings and receiving the bolts which extend outwardly beyond the flange, an annular adapter mounted upon each bolt, and formed integral therewith, and tapered outwardly throughout its entire length to fit within each tapered opening of the disc portion of the inner wheel and serving to rigidly mount such disc portion upon the bolt and having a length to engage the major portion of the wall of the tapered opening of the inner disc portion and to extend for a substantial distance beyond the inner face of such disc portion and having a radially flat end face to contact with the outer flat face of the flange when the adapter is seated and thereby retain the disc portion of the inner wheel spaced from and out of thermal contact with such flange, and a nut carried by the outer end of each bolt and provided with an integral adapter tapered inwardly throughout its entire length to fit within each tapered opening of the disc portion of the outer wheel, the nut and last-named adapter serving to rigidly mount the disc portion of the outer wheel upon the bolt, said last-named adapter having a length to engage with the major portion of the wall of the tapered opening of the outer disc portion, the adapters mounted upon each bolt having their inner ends spaced.

2. A dual wheel assembly comprising a hub having a spoke flange provided with a radially flat outer face and having circumferentially spaced openings extending axially of the flange, a wheel brake drum having a web arranged upon the inner side of the flange and provided with circumferentially spaced openings extending axially of the hub, bolts extending through the openings in the flange and web and corresponding in number to the openings for securing the web to the flange, said bolts extending outwardly beyond the flange, inner and outer disc wheels to be secured to the hub and including disc portions having main openings for receiving a portion of the hub and larger than such hub portion so that the disc portions are free from thermal contact with the hub at the main openings, the inner wheel disc portion having circumferentially spaced openings tapered outwardly throughout their entire lengths and the outer wheel disc portion having circumferentially spaced openings tapered inwardly throughout their entire lengths, the tapered openings formed in each disc portion extending through the opposite faces of such disc portion, the tapered openings extending axially of the hub and being in axial alignment with each other and the openings in the flange and corresponding in number to the flange openings and receiving the bolts which extend outwardly beyond the outer wheel disc portion, an annular adapter mounted upon each bolt, said adapter being tapered outwardly throughout its entire length to fit within each tapered opening of the inner wheel disc portion and rigidly mounting the inner wheel disc portion upon the bolt and being of a length to contact with the major portion of the wall of such tapered opening and to extend inwardly beyond the inner wheel disc portion for a substantial distance and having a radially flat inner end face to contact with the outer flat face of the flange and retain the inner wheel disc portion spaced from and out of thermal contact with the flange, and a nut carried by the outer end of each bolt and provided with an adapter tapered inwardly throughout its entire length to fit within each tapered opening of the outer wheel disc portion, said last named adapter having a length to contact with the major portion of the wall of such tapered opening, the last-named nut serving to rigidly mount the outer wheel disc portion upon the bolt, said adapters having their inner ends spaced.

BUEL H. CANADY.
CLIFFORD J. WILEY.

References Cited in the file of this patent

UNITED STATES PATENTS

| Number | Name | Date |
|---|---|---|
| 1,635,894 | Michelin | July 12, 1927 |
| 1,635,895 | Michelin | July 12, 1927 |
| 1,666,703 | Hunt | Apr. 17, 1928 |
| 2,336,767 | Ash | Dec. 14, 1943 |

FOREIGN PATENTS

| Number | Country | Date |
|---|---|---|
| 215,582 | Great Britain | May 15, 1924 |